(12) United States Patent
Tumati et al.

(10) Patent No.: US 7,249,455 B2
(45) Date of Patent: Jul. 31, 2007

(54) METHOD AND APPARATUS FOR REGENERATING A NITROGEN OXIDES ABSORBER

(75) Inventors: Prasad Tumati, Greenwood, IN (US); Wilbur H. Crawley, Columbus, IN (US)

(73) Assignee: Arvin Technologies, Inc., Troy, MI (US)

( * ) Notice: Subject to any disclaimer, the term of this patent is extended or adjusted under 35 U.S.C. 154(b) by 104 days.

(21) Appl. No.: 10/745,363

(22) Filed: Dec. 23, 2003

(65) Prior Publication Data

US 2005/0132696 A1 Jun. 23, 2005

(51) Int. Cl.
*F01N 3/00* (2006.01)
(52) U.S. Cl. .................. 60/287; 60/286; 60/292; 60/295; 60/303; 60/324
(58) Field of Classification Search .............. 60/274, 60/285, 286, 287, 288, 292, 295, 297, 300, 60/303, 324
See application file for complete search history.

(56) References Cited

U.S. PATENT DOCUMENTS

| | | | |
|---|---|---|---|
| 3,955,538 A | 5/1976 | Noguchi | |
| 4,036,180 A | 7/1977 | Noguchi | |
| 4,066,043 A | 1/1978 | Noguchi | |
| 4,373,330 A * | 2/1983 | Stark | 60/311 |
| 4,651,524 A * | 3/1987 | Brighton | 60/274 |
| 4,848,083 A * | 7/1989 | Goerlich | 60/303 |
| 5,085,049 A | 2/1992 | Rim et al. | |
| 5,207,185 A | 5/1993 | Greiner | |
| 5,617,720 A * | 4/1997 | Achleitner et al. | 60/274 |
| 5,643,536 A * | 7/1997 | Schmelz | 422/105 |
| 5,657,625 A * | 8/1997 | Koga et al. | 60/274 |
| 5,910,097 A | 6/1999 | Boegner et al. | |
| 5,964,088 A * | 10/1999 | Kinugasa et al. | 60/286 |
| 5,974,791 A | 11/1999 | Hirota et al. | |
| 6,105,365 A | 8/2000 | Deeba et al. | |
| 6,170,259 B1 | 1/2001 | Boegner et al. | |
| 6,176,078 B1 | 1/2001 | Balko et al. | |
| 6,422,006 B2 | 7/2002 | Ohmori et al. | |
| 6,446,430 B1 | 9/2002 | Roth et al. | |
| 6,464,744 B2 | 10/2002 | Cutler et al. | |
| 6,679,051 B1 | 1/2004 | van Nieustadt et al. | |
| 6,865,879 B2 * | 3/2005 | Posselt et al. | 60/276 |
| 7,032,376 B1 * | 4/2006 | Webb et al. | 60/297 |
| 2003/0066287 A1 | 4/2003 | Hirota et al. | |
| 2003/0074893 A1 | 4/2003 | Webb et al. | |
| 2004/0006977 A1 | 1/2004 | Nakatani et al. | |

FOREIGN PATENT DOCUMENTS

JP 403074513 A * 3/1991 .................. 60/295

OTHER PUBLICATIONS

"$No_x$ Emission Control For Light-Duty CIDI Vehicles," *Department of Energy* (Apr. 2001).

\* cited by examiner

*Primary Examiner*—Binh Q. Tran
(74) *Attorney, Agent, or Firm*—Barnes & Thornburg LLP

(57) ABSTRACT

A diesel engine exhaust system includes a NOx absorber and a diesel fuel fired burner operated at an enriched fuel-to-air ratio to generate a sufficient quantity of CO and $H_2$ for regenerating the NOx absorber. A method of operating a diesel exhaust system is also disclosed.

6 Claims, 3 Drawing Sheets

METHOD AND APPARATUS FOR REGENERATING A NITROGEN OXIDES ABSORBER

FIELD OF THE DISCLOSURE

The present disclosure relates to exhaust emission reduction systems for diesel engine exhaust streams, and, more particularly, to emission reduction systems having a nitrogen oxides (NOx) reduction component.

BACKGROUND

Diesel engine combustion exhaust includes various emissions, such as carbon dioxide, carbon monoxide, unburned hydrocarbons, NOx, and particulate matter (PM). Increasingly, environmental regulations call for emissions controls to aggressively lower diesel exhaust emission levels for NOx and PM. These standards include, for example, EURO 4 (2005) and EURO 5 (2008) and U.S. Year 2004 and U.S. Phased 2007-2010 Emissions Limit Standards. Regulations are increasingly limiting the amount of NOx that can be emitted during a specific drive cycle, such as the FTP (Federal Test Procedure) in the United States or the MVEG (Mobile Vehicle Emission Group) in Europe.

One of the ways known in the art to remove $NO_x$ from diesel engine exhaust gas is by catalyst reduction. The catalyst reduction method essentially includes passing the exhaust gas over a catalyst bed in the presence of a reducing gas to convert the NOx into nitrogen. For example, known emission reduction systems include systems for supplying fuel oil as hydrocarbon (HC) reductant or ammonia provided in the form of urea, either of which are injected into the exhaust gas upstream of the NOx catalyst.

Another way to remove $NO_x$ from diesel exhaust gas is by use of a $NO_x$ absorber catalyst. In this case, $NO_x$ is trapped in the absorber catalyst as the exhaust gas stream passes therethrough. Over time, the absorber catalyst may become saturated with $NO_x$. To alleviate such a condition, the absorber catalyst is periodically regenerated to remove the $NO_x$ from the absorber catalyst by converting the trapped to $NO_x$ to nitrogen.

Diesel particulate filters (DPF) for the removal of PM from a diesel engine exhaust stream have been proven effective to remove carbon soot. A widely used DPF is the wall flow filter which filters the diesel exhaust by capturing the particulate material on the porous walls of the filter body.

SUMMARY OF THE DISCLOSURE

According to one aspect of the disclosure, an exhaust emission reduction system for reducing exhaust stream emissions produced by a diesel engine includes a NOx absorber, a diesel fuel fired burner, and a diesel particulate filter (DPF). The NOx absorber absorbs substances attributable to diesel fuel sulfur content and oxides of nitrogen. The burner operates at a high fuel-to-air ratio that provides a large quantity of CO and $H_2$ to the exhaust stream, thereby regenerating and increasing the capacity of the NOx absorber.

In a specific exemplary implementation, the exhaust emission reduction system includes a bypass path through which most of the exhaust stream may be redirected during periodic firing of the burner and regeneration of the NOx absorber. Additionally, the DPF is disposed in the exhaust stream between the burner and NOx absorber to remove particulate matter (PM) produced by the burner and diesel engine. In another specific exemplary implementation, the system includes two parallel reduction paths each including a burner, a DPF, and a NOx absorber. The exhaust stream may be selectively directed to one of the reduction paths while the other path is regenerating.

In certain implementations, the emission reduction system may be configured to include an aggregate box for receiving the exhaust stream and high-temperature valves for selectively directing portions of the exhaust stream from the aggregate box through the reduction path and the bypass path. The reduction path includes the diesel fuel fired burner, the DPF, and the NOx absorber. The bypass path may simply include an exhaust pipe for advancing the exhaust stream. The exhaust streams passing through the reduction path and the bypass path may be re-joined and thereafter directed through a muffler and exhaust pipe. A controller controls the burner and the valves. The system may be operated in a reducing mode in which substantially the entire exhaust stream is directed through the reduction path components and the burner is not operating or is minimally operating. Additionally, in the reducing mode, the DPF removes PM and the NOx absorber traps NOx emissions from the exhaust stream. In order to regenerate the NOx absorber, the controller periodically operates the system in a regenerating mode by controlling the valves to redirect a large portion of the exhaust stream through the bypass path and operating the burner at a highly enrichened fuel-to-air mixture, thereby producing excessive CO and $H_2$ for regenerating the NOx absorber. Additionally, the controller may also periodically operate the burner at a normal mixture setting and a high temperature which regenerates the DPF by providing a temperature suitable for incineration of PM trapped in the DPF.

In the case of an emission reduction system that includes two parallel reduction paths while one reduction path is being regenerated, the other path is available for reducing emissions in the engine exhaust stream.

DETAILED DESCRIPTION OF THE DRAWINGS

Figure 1:
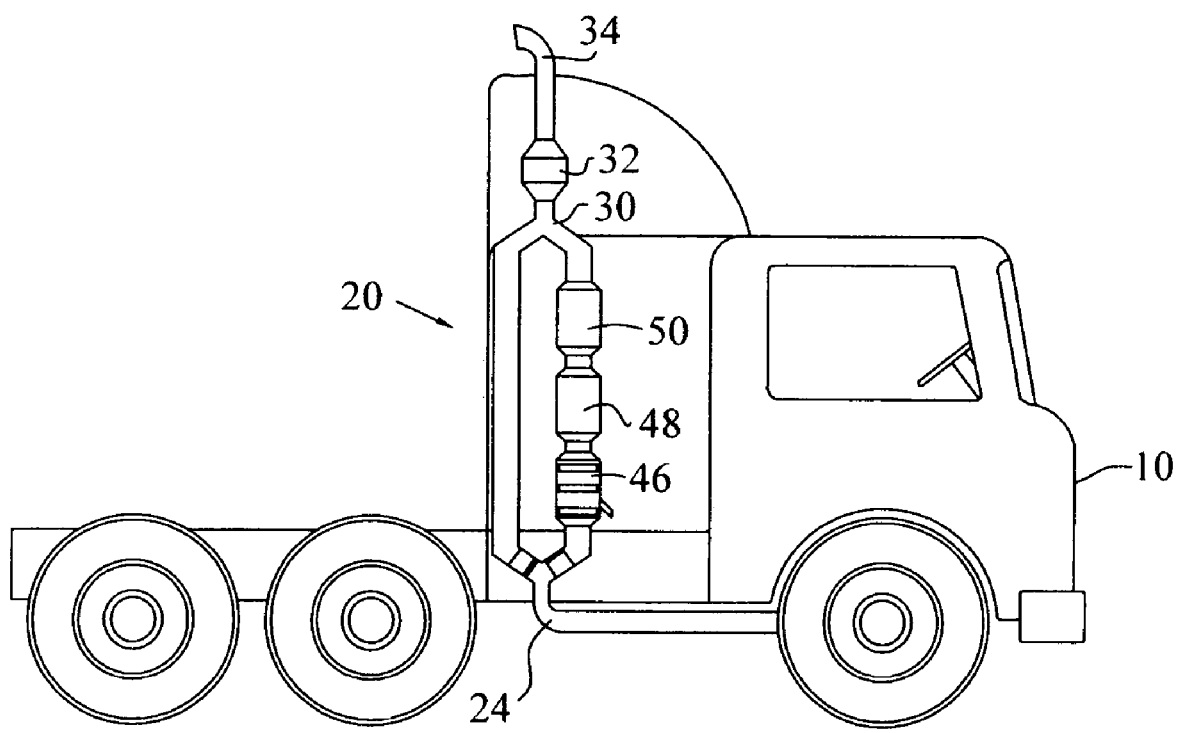
FIG. 1 is an assembly view of an exhaust emission reduction system for use with a diesel engine of a vehicle.
Figure 2:
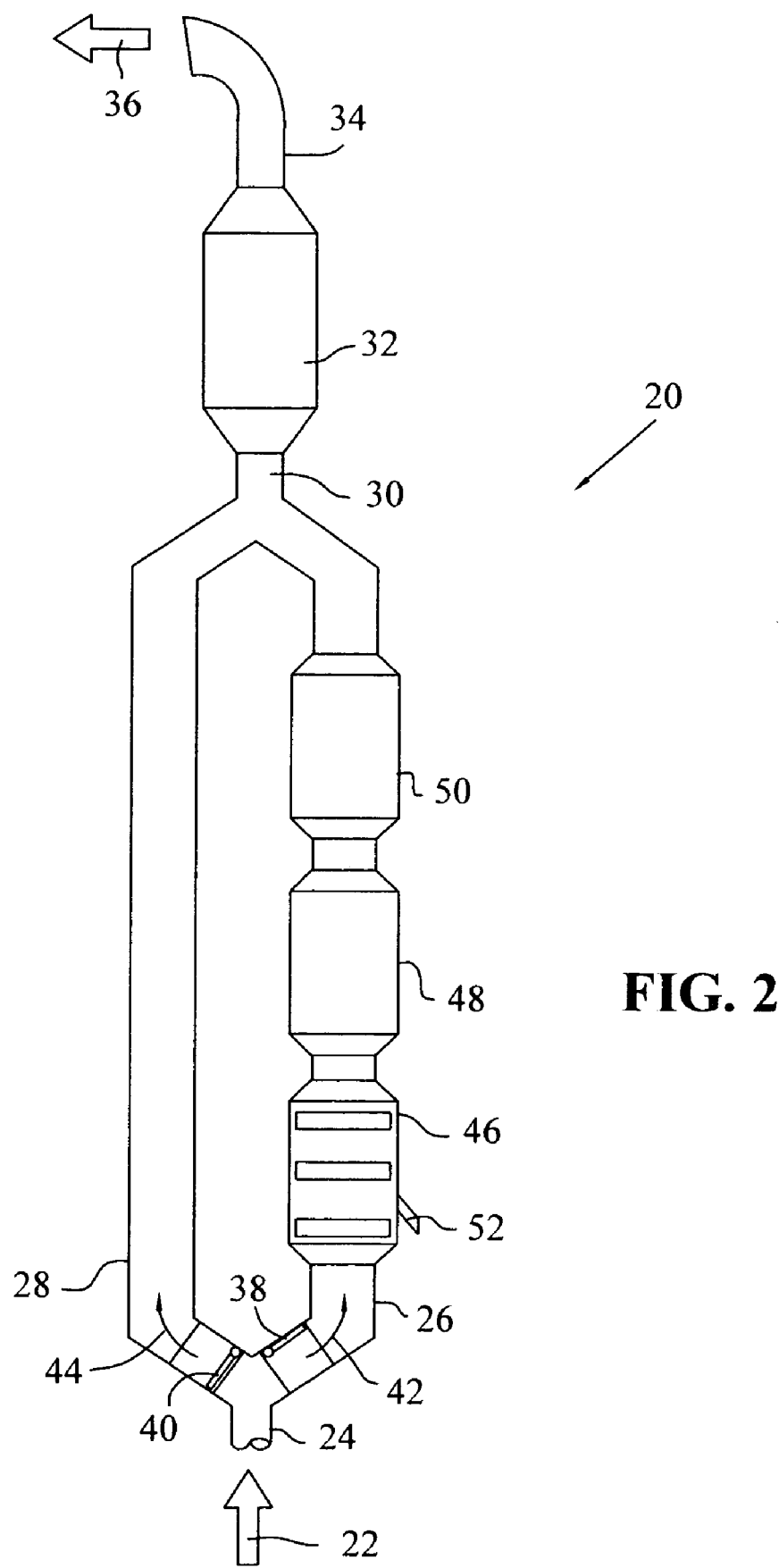
FIG. 2 is a plan view of a first exemplary embodiment of the exhaust emission reduction system of FIG. 1.

A vehicle 10, shown in FIG. 1, is powered by a diesel engine (not shown) and includes an exhaust emission reduction system 20 for removing nitrogen oxides (NOx) and particulate matter (PM) from a diesel exhaust stream as shown in FIG. 2. The emission reduction system 20 generally includes an aggregate box junction 24, a reduction path 26, a bypass path 28, an exit junction 30, a muffler 32, and an exhaust pipe 34. The aggregate box junction 24 receives an exhaust stream 22 and is coupled to the reduction path 26 and the bypass path 28, which are parallel paths for transmitting the exhaust stream 22. A two-way high temperature valve 38 controls a first stream portion 42 of the exhaust stream 22 flowing into the reduction path 26. A two-way high temperature valve 40 controls a second stream portion 44 of the exhaust stream 22 flowing into the bypass path 28. The reduction path 26 and the bypass path 28 are also joined at an exit junction 30 which is coupled to the muffler 32. The exhaust pipe 34 is coupled to the muffler 32 and vents a processed exhaust stream 36 to the atmosphere.

The reduction path 26 includes components for reducing emissions contained in the first stream portion 42. The reduction path 26 includes a diesel fuel fired burner 46, a diesel particulate filter (DPF) 48, and a NOx absorber 50, illustratively in that order relative to the flow of the first stream portion 42. Additionally, the reduction path 26 or the exit junction 30 may include a diesel oxidation catalyst (DOC) (not shown).

The NOx absorber 50 includes at least one catalyst absorber (not shown) that converts engine exhaust NOx into nitrogen. Such catalysts may include, for example, potassium or barium-based catalyst supported by a ceramic or metallic substrate. To recharge the NOx absorber 50 when it is nearing capacity, CO and $H_2$ are added to the first stream portion 42 and are carried into the NOx absorber 50 to desorb and regenerate the absorber. The CO and $H_2$ are produced by combustion of diesel fuel in the burner 46. Additional NOx absorbers may also be included in the reduction path 26 in parallel or in series with the NOx absorber 50. Exemplary NOx absorbers may be, for example, NOx absorbers manufactured by Engelhard Corporation of Iselin, N.J., and Johnson Matthey of London, England.

The DPF 48 includes a filter structure (not shown) for trapping and combusting diesel exhaust PM, such as carbon soot. The filter structure may be, for example, a porous ceramic forming a plurality of end-plugged honeycomb structures that are efficient at removing carbon soot from the exhaust of diesel engines. The filter structure may also include a catalyst that provides ignition and incineration of carbon soot at a lower temperature range. The DPF 48 may be, for example, a filter manufactured by Corning Incorporated of Corning, N.Y. The DPF 48 may also be embodied as any of the filters described in U.S. Pat. No. 6,464,744.

The diesel fuel fired burner 46 receives a supply of diesel fuel at a supply line 52 and is capable of increasing the temperature of the first stream portion 42 of the exhaust of a diesel engine. The products of combustion of diesel fuel in the burner 46 include CO, $H_2$, and soot. CO and $H_2$ act as reducing compounds for removal of nitrogen oxides from the absorber 50, exhausting the nitrogen as $N_2$ thereby regenerating the absorber to trap additional NOx. If the burner 52 is operated at an enriched setting, i.e., the fuel-to-air ratio is increased beyond that used for peak heat production and/or efficient combustion, the burner produces significant quantities of CO and $H_2$ which are then carried by the first stream portion 42 into the NOx absorber 50. Any soot produced by the burner 46 is trapped by the DPF 48 before the exhaust stream portion 42 reaches the NOx absorber 50.

The exhaust emission reduction system 20 includes a control device (not shown) for controlling actuation of the valves 38 and 40 and the burner 46. During operation of emission reduction system 20 in a reduction mode, the valve 38 is positioned in an open position thereby allowing the stream portion 42 of the exhaust stream 22 to flow into the reduction path 26, and the valve 40 is positioned in the closed position thereby reducing the second stream portion 44 of the exhaust stream 22 to substantially no flow. Additionally in the reduction mode, the burner 46 is off or in a reduced operating setting, the DPF 48 traps PM contained in the exhaust stream portion 42, and the NOx absorber 50 traps NOx. The reduction mode of emission reduction system 20 may provide approximately 60 to 90 seconds of emission reduction before regeneration is necessary, but may provide 50 to 100 seconds, or more or less, depending on the capacity of the NOx absorber 50 and the volume of the emissions of exhaust stream 22.

The emission reduction system 20 is operated in a regeneration mode to regenerate the NOx absorber 50. To do so, the controller switches the valve 38 to a closed position, substantially reducing the first stream portion 42 of the exhaust stream 22 flowing through the reduction path 26. The controller also switches the valve 40 to an open position, substantially increasing the second stream portion 44 of the exhaust stream 22 flowing through the bypass 28 and therefore around the burner 46, the DPF 48, and the NOx absorber 50. In an exemplary implementation, approximately 70% of the exhaust stream 22 flows through the bypass path 28 during the regeneration mode. The controller also operates the burner 46 at a very rich fuel-to-air mixture, thus producing significant quantities of CO and $H_2$ in the exhaust stream portion 42 that is provided to the NOx absorber 50 for regenerating, i.e., restoring the capacity of, the absorber catalyst. The DPF 48 traps any soot generated by operating the burner 46 at a rich mixture. The regeneration mode may continue for approximately 20 seconds but may last from 10 to 30 seconds, or more or less depending on the quantities of CO and $H_2$, the temperature of the exhaust stream 22, and the characteristics of NOx absorber 50.

The exhaust emission reduction system 20 will repeatedly cycle between the reduction and regeneration modes during operation of the diesel engine. Additionally, the DPF filter 46 may require periodic regeneration, for example, every two to four hours of operation, in order to more fully combust and remove soot trapped by the DPF 48.

The burner 46 may also be operated by the controller to raise the temperature of the first exhaust stream portion 42 entering the DPF 48 to a range of 600° to 650° C., but less than a temperature causing damage to the filter structure within the DPF 48, for example, less than 1000° C., perhaps less than 900° C. If a catalytic treated DPF is used, regeneration of the DPF 48 may only require elevating the temperature of the first stream portion 42 to between 300° to 350° C. Elevation of the temperature of the first stream portion 42 to more than 500° C. 600° C. provides desulfation (i.e., $SO_x$ removal), and therefore regeneration, of the NOx absorber 50. Desulfation frees absorbed substances, primarily sulfur, from absorber storage sites and therefore restores capacity of the NOx absorber 50.

Figure 3:
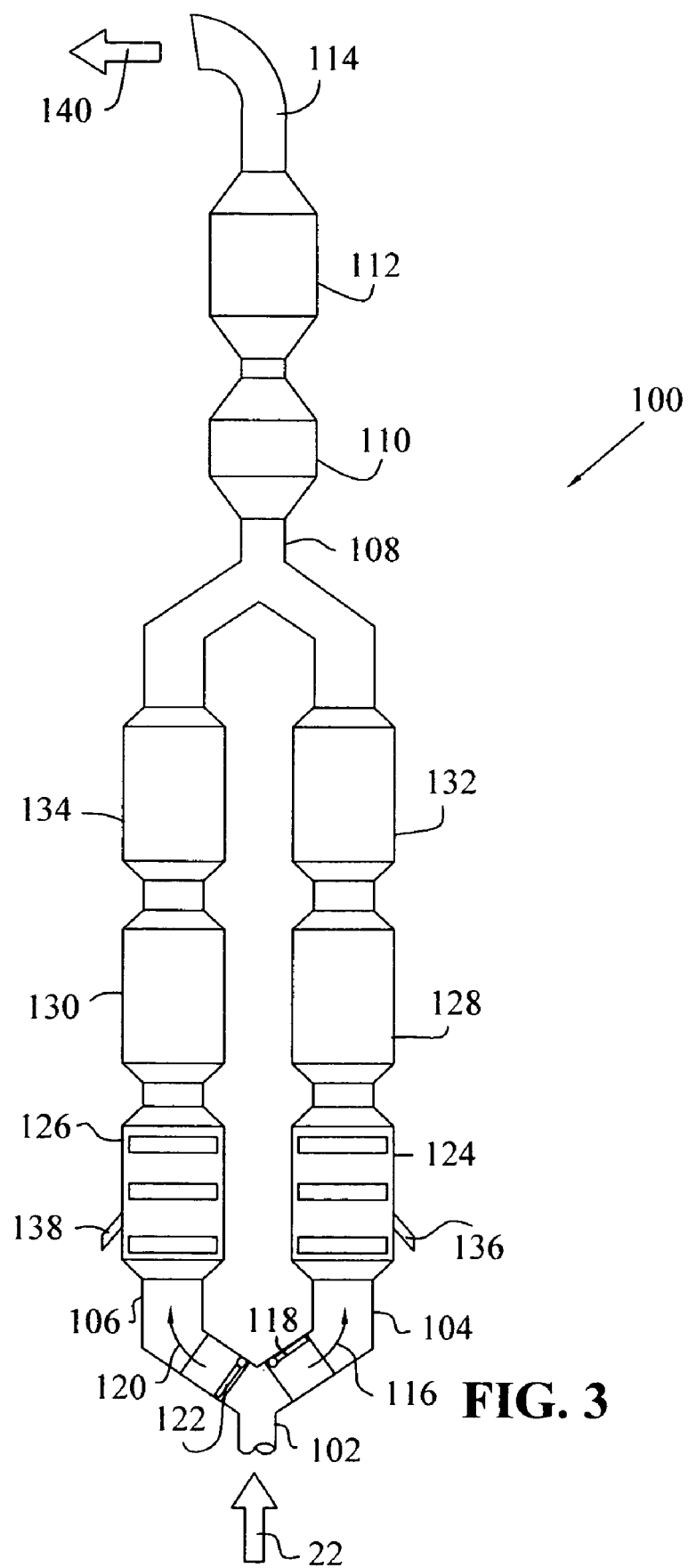
FIG. 3 is a plan view of a second exemplary embodiment of the exhaust emission reduction system of FIG. 1.

Referring to FIG. 3, a second exemplary embodiment of an exhaust emission reduction system 100 generally includes an aggregate box junction 102, a first reduction path 104, a second reduction path 106, an exit junction 108, a DOC 110, a muffler 112, and an exhaust pipe 114. The first reduction path 104 and the second reduction path 106 are parallel paths for the exhaust stream 22 and receive a first exhaust stream portion 116, controlled by a valve 118, and a second exhaust stream 120, controlled by a valve 122. Each reduction path 104 and 106 may include the same emission reduction components as the reduction path 26 of the emission reduction system 20, namely a diesel fuel fired burner 124 and 126, a DPF 128 and 130, and a NOx absorber 132 and 134. Each of these components of the first reduction path 104 and the second reduction path 106 may operate as described in regard to the reduction path 26 of the emission reduction system 20.

Because the emission reduction system 100 includes two parallel reduction paths, one reduction path (104 or 106) can receive and reduce emissions of the exhaust stream 22 while the other path is being regenerated. For example, the valve

118 may be positioned in its open position and the valve 122 positioned in its closed position. In such a case, the first stream portion 116 includes substantially all of the exhaust stream 22 and the burner 128, the DPF 128, the NOx absorber 132, and the DOC 110 create a processed exhaust stream 140 which has reduced levels of NOx, PM, and HC. While the first reduction path 104 is in the reduction mode, the second path 106 may be regenerating, as described above in regard to the exhaust emission reduction system 20.

The diesel oxidation catalyst (DOC) 110 receives the first and second exhaust stream portions 42 and 44 and reduces unburned HC and CO present in the exhaust stream. The DOC 110 catalyzes the oxidation of unburned HC and CO. Such a device is available from ArvinMeritor, Inc. of Troy, Mich. The muffler 112 and the exhaust pipe 114 provide engine exhaust noise reduction and directing of the processed exhaust stream 140 into the atmosphere.

The invention claimed is:

1. A diesel exhaust system comprising:
   a first reduction path having (i) a first diesel fuel fired burner operated to introduce at least one of CO and $H_2$ into an exhaust stream, and (ii) a first emissions reduction component positioned downstream of the first burner, the first emissions reduction component being configured to be regenerated by CO and $H_2$ in the exhaust stream, and
   a second reduction path having (i) a second diesel fuel fired burner operated to introduce at least one of CO and $H_2$ into an exhaust stream; (ii) a second emission reduction component positioned downstream of the second burner, the second emissions reduction component being configured to be regenerated by CO and $H_2$ in the exhaust stream; and (iii) at least one valve operable to selectively direct portions of the exhaust stream between the first and the second reduction paths.

2. The system of claim 1, wherein the first emission reduction component includes a catalytic NOx absorber.

3. The system of claim 2, wherein the first burner is periodically operated at a fuel-to-air mixture providing increased production of at least one of CO or $H_2$.

4. The system of claim 2, further comprising a particulate filter disposed in the exhaust stream between the first burner and the $NO_x$ absorber.

5. The system of claim 4, wherein the first burner is operable to heat the exhaust stream to a temperature sufficient for at least one of incinerating a substantial portion of the particulates trapped by the filter or removing $SO_x$ from the NOx absorber.

6. The system of claim 1, wherein the first and the second emissions reduction components include NOx absorbers.

* * * * *